(12) United States Patent  (10) Patent No.: US 7,936,501 B2
Smith et al.  (45) Date of Patent: *May 3, 2011

(54) CONTACT MICROSCOPE USING POINT SOURCE ILLUMINATION

(75) Inventors: Barton A. Smith, Campbell, CA (US); Thomas F. Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/059,114

(22) Filed: Mar. 31, 2008

(65) Prior Publication Data

US 2008/0259444 A1  Oct. 23, 2008

Related U.S. Application Data

(63) Continuation of application No. 11/737,879, filed on Apr. 20, 2007.

(51) Int. Cl.
*G02B 21/00* (2006.01)

(52) U.S. Cl. ........................................ 359/368; 359/385

(58) Field of Classification Search ........................ None
See application file for complete search history.

(56) References Cited

U.S. PATENT DOCUMENTS

| | | | |
|---|---|---|---|
| 1,996,141 A * | 4/1935 | Broadhurst et al. | 359/397 |
| 4,677,473 A | 6/1987 | Okamoto et al. | |
| 4,974,094 A | 11/1990 | Morito | |
| 5,258,791 A | 11/1993 | Penney et al. | |
| 5,831,763 A * | 11/1998 | Meyer | 359/391 |
| 6,101,028 A * | 8/2000 | Heacock et al. | 359/368 |
| 6,104,495 A | 8/2000 | Sieben et al. | |
| 6,327,102 B1 | 12/2001 | Naulleau et al. | |
| 6,525,878 B1 | 2/2003 | Takahashi | |
| 6,643,390 B1 * | 11/2003 | Clark et al. | 382/124 |
| 6,674,057 B1 | 1/2004 | Wiegraebe et al. | |
| 6,710,331 B2 | 3/2004 | Narita et al. | |
| 6,749,346 B1 * | 6/2004 | Dickensheets et al. | 385/88 |
| 6,982,740 B2 * | 1/2006 | Adair et al. | 348/76 |
| 7,110,645 B2 | 9/2006 | Birk et al. | |
| 2002/0123073 A1 * | 9/2002 | Amirkhanian et al. | 435/7.1 |

(Continued)

FOREIGN PATENT DOCUMENTS

DE  10158964 A1 *  8/2003

OTHER PUBLICATIONS

Smith, et al. U.S. Appl. No. 11/737,879, Office Action Communication, Apr. 22, 2009, 8 Pages.

(Continued)

*Primary Examiner* — Lee Fineman
(74) *Attorney, Agent, or Firm* — Gibb I.P. Law Firm, LLC

(57) ABSTRACT

The embodiments of the invention include a microscope having a transparent specimen holder and a digital imaging device positioned within the transparent specimen holder. The digital imaging device can include a wireless transmitter. The transparent specimen holder can have a top surface and a bottom surface, wherein the transparent specimen holder is completely transparent between the top surface and the bottom surface. Thus, the transparent specimen holder is completely transparent above and below the digital imaging device. Furthermore, a processor is operatively connected to the digital imaging device, wherein the processor produces an image of a specimen positioned on the specimen holder. A display is operatively connected to the processor, wherein the display displays the image.

7 Claims, 9 Drawing Sheets

U.S. PATENT DOCUMENTS

| | | | |
|---|---|---|---|
| 2003/0193817 A1* | 10/2003 | Yoneda et al. | 362/555 |
| 2004/0126049 A1* | 7/2004 | Tolmachev et al. | 385/12 |
| 2005/0047172 A1 | 3/2005 | Sander | |
| 2005/0171413 A1* | 8/2005 | Blair | 600/310 |
| 2008/0088918 A1* | 4/2008 | O'Connell | 359/371 |

OTHER PUBLICATIONS

Smith et al., U.S. Appl. No. 11/737,879, Office Action Communication, Sep. 16, 2009, 7 pages.

Smith et al., U.S. Appl. No. 11/737,879, Office Action Communication, Feb. 24, 2010, 8 pages.

Smith et al., U.S. Appl. No. 11/737,879, Office Action Communication, Jun. 24, 2010, 9 pages.

Smith et al., U.S. Appl. No. 11/737,879, Office Action Communication, Nov. 26, 2010, 9 pages.

* cited by examiner

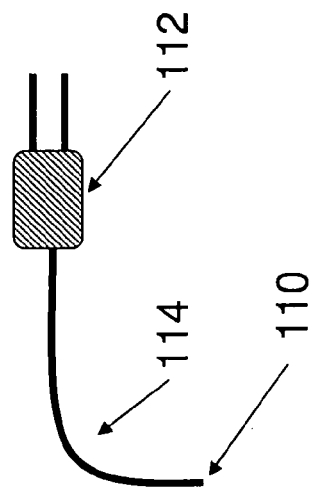
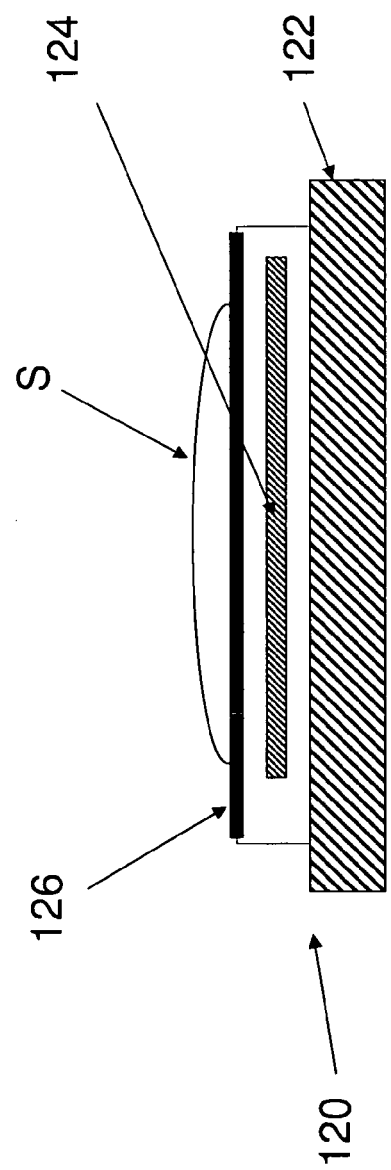
FIG. 1

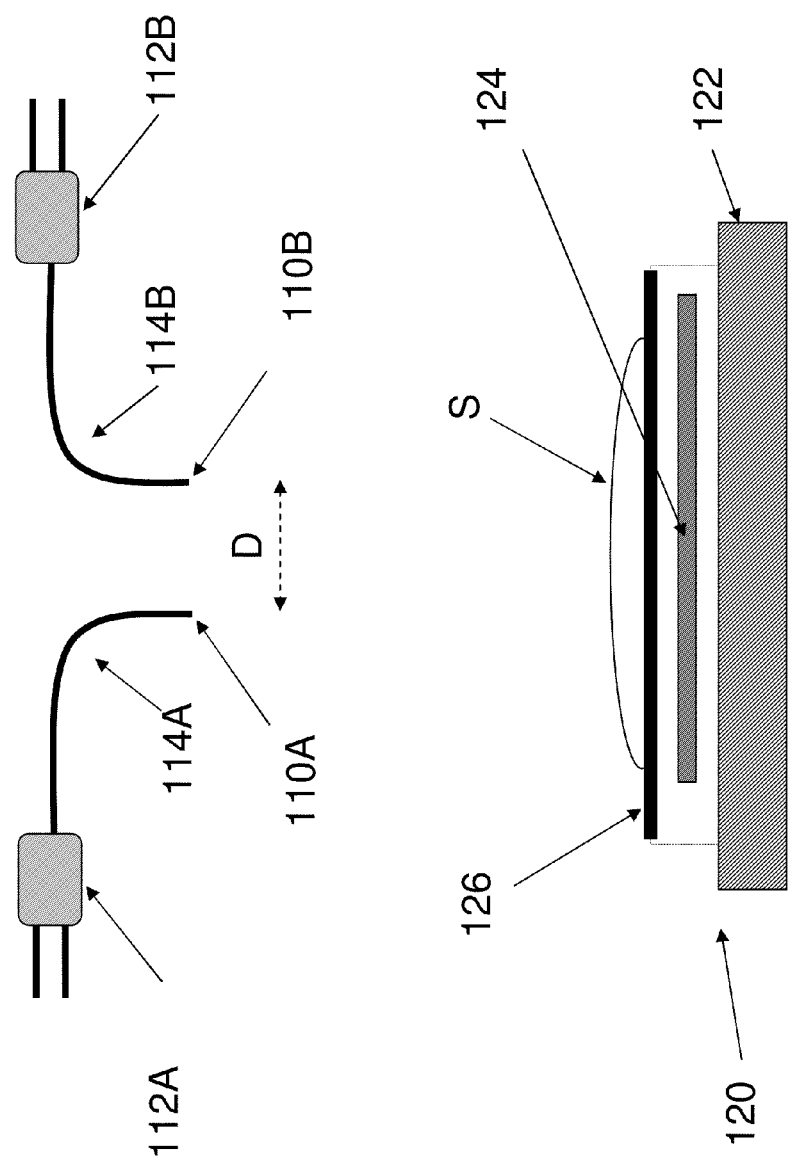

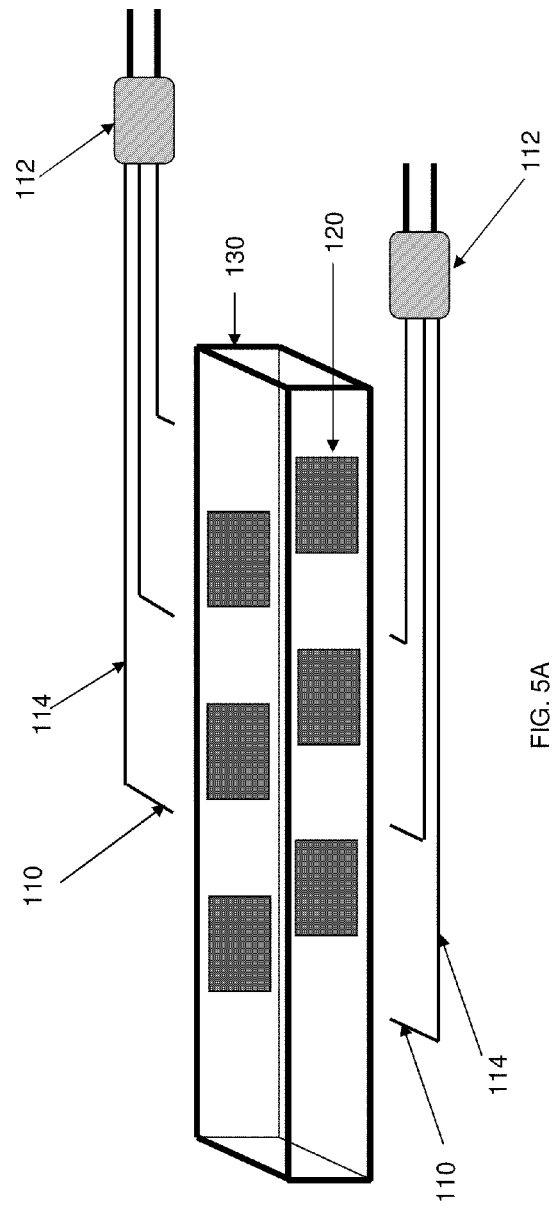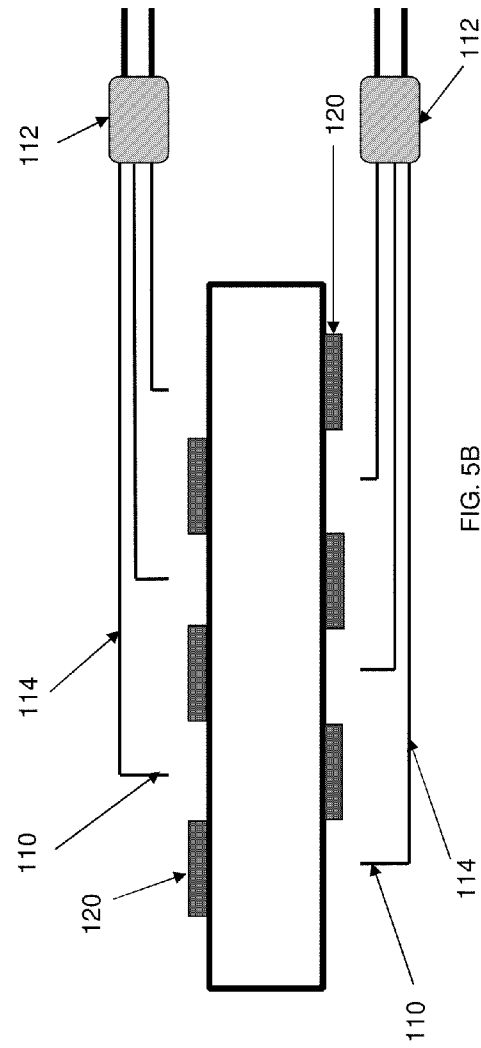
FIG. 5A
FIG. 5B

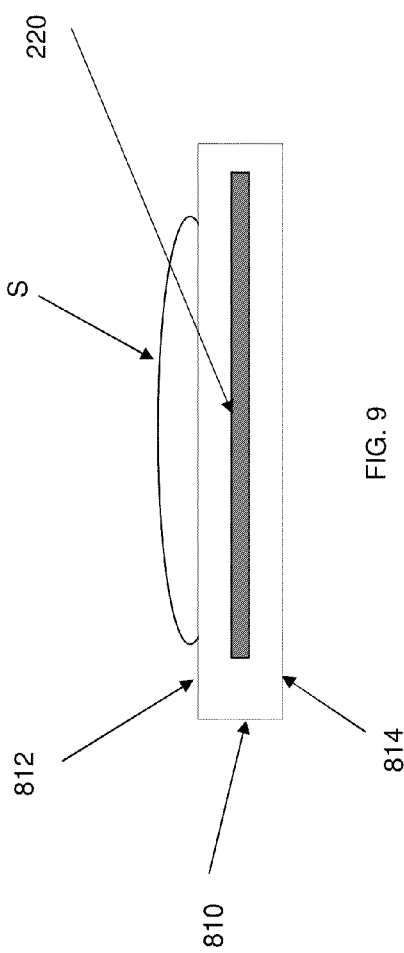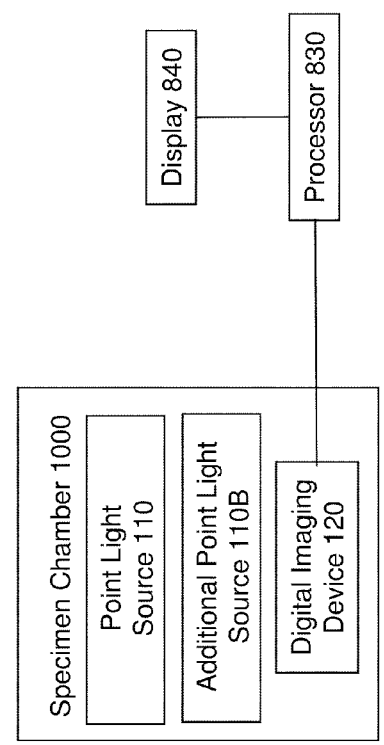

CONTACT MICROSCOPE USING POINT SOURCE ILLUMINATION

CROSS-REFERENCE TO RELATED APPLICATIONS

This application is a continuation of U.S. application Ser. No. 11/737,879 filed Apr. 20, 2007, the complete disclosure of which, in its entirety, is herein incorporated by reference.

BACKGROUND

1. Field of the Invention

The embodiments of the invention provide a contact microscope using point source illumination.

2. Description of the Related Art

Amateurs often have problems operating microscopes, including preparing specimens, focusing the lens, inadvertently smashing objectives into slides, and getting the lighting correct. Students find it challenging to faithfully draw and take measurements of what they see. Images may be captured by attaching a camera to the microscope, albeit adding to the cost and complexity of the microscope. Optical microscopes are large, heavy, and delicate instruments that must be kept clean. It is desired that a microscope be lightweight, compact, easy to use, inexpensive, and have a video or computer interface.

Often in biological research, organisms are processed (collected, grown, centrifuged) then viewed under a microscope in two separate operations. It is desired to have a microscope small and robust enough to be placed in the processing environment to simultaneously process and view organisms.

SUMMARY

The embodiments of the invention place objects between a point light source and an imaging array. The object either blocks light rays, casting a shadow on the imaging array, or bends light rays as it passes through media of having a different index of refraction, producing an image of varying levels of brightness. The imaging array interfaces to a computer or video monitor enabling image capture and processing (e.g. computer assisted measurement). The microscope is about an order of magnitude less expensive then a comparable camera-equipped optical microscope.

The embodiments of the invention include a microscope having a transparent specimen holder and a digital imaging device positioned within the transparent specimen holder. The digital imaging device can include a wireless transmitter. The transparent specimen holder can have a top surface and a bottom surface, wherein the transparent specimen holder is completely transparent between the top surface and the bottom surface. Thus, the transparent specimen holder is completely transparent above and below the digital imaging device. Furthermore, a processor is operatively connected to the digital imaging device, wherein the processor produces an image of a specimen positioned on the specimen holder. A display is operatively connected to the processor, wherein the display displays the image.

The microscope can also include at least two point light sources proximate the digital imaging device. The point light sources can be positioned in a location adjacent the specimen holder so as to illuminate the specimen. Each of the point light sources can have a monochromatic light emitting diode (LED) operatively connected to a fiber optic cable. Additionally, a mobile point light source can be provided, wherein the mobile point light source is movable relative to the digital imaging device. A controller can control movement of the mobile point light source, such that movement of the mobile point light source corresponds to user movement of the controller. Moreover, a headgear can be included, wherein the controller and/or the display are connected to the headgear.

Another microscope can include a hermetically sealed specimen chamber, wherein a point light source is positioned within the specimen chamber. At least one additional point light source can also be positioned within the specimen chamber. A digital imaging device is also positioned within the specimen chamber, wherein a processor is operatively connected to the digital imaging device. A display operatively connected to the processor is also provided, wherein the processor produces an image and the display displays the image.

Microscopes are important tools to visualize objects too small or translucent for the human eye to see. Optical microscopes use lenses to magnify the size of an object for ocular viewing. A camera may be attached to a microscope to capture images. The present invention teaches a new microscope that places the object between a point light source and an imaging array. The resulting microscope is less expensive, easier to use, smaller, more flexible and robust than a conventional optical microscope.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 1 illustrates an optical microscope having a point light source and an imager;

FIG. 2 illustrates a stereo optical microscope having two point light sources and an imager;

FIG. 5A illustrates an arbitrarily wide optical microscope having multiple point light sources and multiple imagers;

FIG. 5B illustrates a top view of the arbitrarily wide optical microscope shown in FIG. 5A;

FIG. 9 illustrates a digital imaging device positioned within a transparent specimen holder; and FIG. 10 illustrates a specimen chamber.

DETAILED DESCRIPTION OF PREFERRED EMBODIMENTS

Figure 3A:
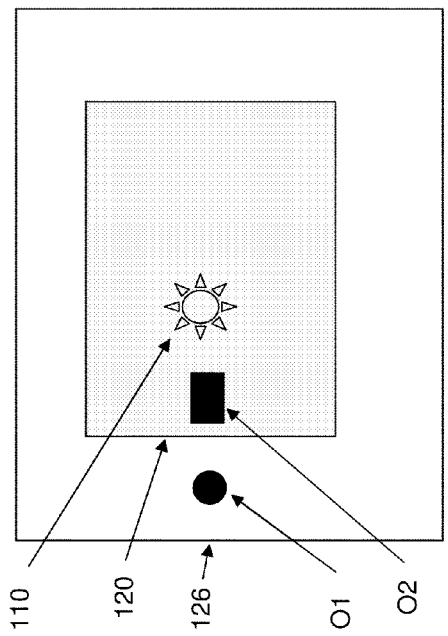
FIG. 3A illustrates an optical microscope having a point light source in a first position.
Figure 4A:
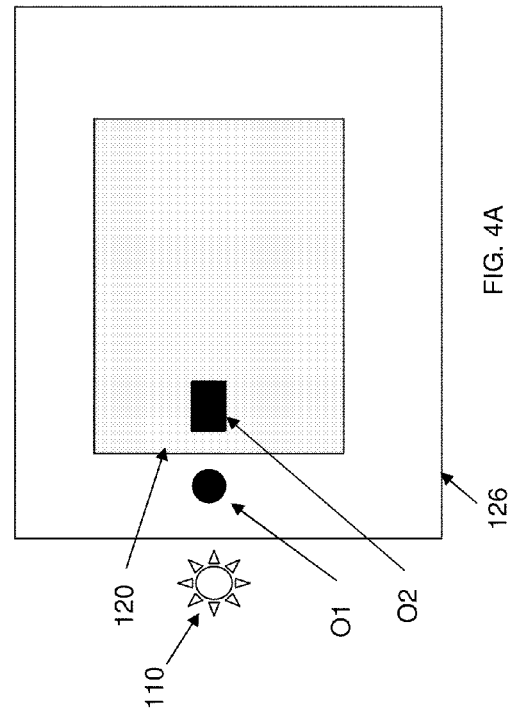
FIG. 4A illustrates an optical microscope having a point light source in a second position.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Microscopes are important tools to visualize objects too small or translucent for the human eye to see. Optical microscopes use lenses to magnify the size of an object for ocular viewing. A camera may be attached to a microscope to capture images. The present invention teaches a new microscope that places the object between a point light source and an imaging array. The resulting microscope is less expensive, easier to use, smaller, more flexible and robust than a conventional optical microscope.

The optical microscopes of the embodiments herein have many advantages when compared to conventional lens microscopes. For instance, the optical microscopes herein can include a large accessible space over the sample for additional equipment. The optical microscopes can also be put in a centrifuge, oven, refrigerator, and/or pressurized/vacuum under any gas while viewing subjects.

As illustrated in FIG. 1, the optical microscopes herein include at least one point light source 110. More specifically, a blue (short wavelength) LED 112 can be used as a light source, coupled through a thin fiber optic 114 to create a point light source 110 that can be positioned above the object/specimen S. Alternately a small LED (e.g. surface mount LED) may be positioned above the object/specimen S to create a point light source. Microscopes of the embodiments herein can lack moving parts, and can lack lenses to focus, clean or break. The optical microscopes can be made stereo using one imager and two light sources using alternate field multiplexing (switching LED instead of video signal) or different colors (e.g. red and green). Further, the optical microscopes herein can use commercial imager array and capture software, digital imagers (VGA to 8 Mpix), and/or video imagers (near QVGA resolution @ 60 Hz). The optical microscopes can also continuous monitor samples in multiple tubes placed substantially near the imager sensor light source 110. As described more fully below, by using two such light sources 110, alternately energized in synchrony with frames of a video imager, a stereo image may be produced.

Furthermore, an imager 120 is provided, wherein the imager 120 can include a Complementary Metal Oxide Semiconductor (CMOS) imager die 124 between a circuit board 122 and a glass plate 126, and wherein the glass plate 126 supports the specimen S. A commercial imager can be used, such as those mass manufactured for consumer digital cameras and security cameras, to take advantage of the economies of scale of producing millions of imagers. The contact microscope benefits from smaller pixel size (the smaller the pixel the greater the spatial resolution), as does commercial imagers for the smaller the pixel size, the less silicon is used to produce an imager, and lower the resulting imager die and cost. The embodiments of the invention provide exceptional illumination to the imager 120, orders of magnitude greater than a lens camera. The abundance of illumination results in significant signal-to-noise (SNR), relaxing pixel area and fill factor parameters, allowing imagers with exceptionally small pixels to be manufactured. Hence the resolution of the microscope can push the limits of imaging chip fabrication and pixel size which is currently about 2 um for consumer digital cameras.

Several pixel architectures can be used in CMOS imagers including Passive Pixel Sensors (PPS), using one transistor per pixel, CMOS Active Pixel Sensor (APS) which dedicates three to four transistors per pixel, and CMOS Digital Pixel Sensor (DPS) where each pixel has an ADC. Using a custom imager, a CMOS DSP can implement a comparator producing one bit per pixel and can use an illumination source (e.g., LED) controlled by a digital-to-analog converter (DAC) to select an illumination brightness to produce a preferred image with optimal feature presentation. The optimal illumination is selected though a process of successive approximation, as taught in successive approximation analog-to-digital converters, where a desired image is searched by successively testing a progression of high to low order bits, corresponding to finer changes in brightness.

The embodiments of the invention could include a specimen chamber that can be made hermetic by placing the point light source 110 inside the chamber (e.g. plastic cuvette) using the fiber optic 114. This would allow the chamber to be pressurized, pull a partial vacuum, or introduce an arbitrary gas atmosphere.

In addition, because the microscope can be very small, compact, and light weight, it can be placed in a centrifuge using a battery and wireless transmitter to eliminate wires, to study organisms under >1 G environments. Specimens in a solution may be introduced in the center of the vessel and pulled outward towards the microscope, collecting by the microscope. A small bleeder valve of fixed diameter, or alternately of variable size wirelessly controlled, releases the solution allowing new solution to be added without stopping the centrifuge, providing a continuous means to concentrate samples by centrifugal forces. The microscope may also be placed underwater, on a cable towed by a boat for surveying microscopic organisms in vivo.

Moreover, the microscope can view organisms in a square tube or multiple round tubes as they pass by the imager 120, allowing continuous monitoring of specimens. This way a large volume may be examined for specimens that may present at a low volumetric density (organism/liter), for example when collecting organisms found in pond water.

When a point light source 110 is substantially far from the object/specimen, the emerging lights ray may be considered parallel, producing a projection of an object on the imager plane (shadows) with dimensions corresponding directly to the dimensions of the object. However, if the point light source 110 is close to the object relative to the distance of the object to the imager 120, the light rays emitting from the point light source 110 diverge, resulting in a magnification of the shadow projected on the imager 120.

As illustrated in FIG. 2, the optical microscopes can be made stereo using one imager 120 and two point light sources 110A and 110B, separated by distance D using alternate field multiplexing (switching LED instead of video signal). Thus, two point light sources 110A and 110B can be sequentially selected, causing the imager 120 to output a disparity signal synchronous to the interlace frames of the video imager 120.

The disparity signal contains the x, y, z location of specimen S in the viewing area of imager 120. For example, LED 112A can turn on during even frames and LED 112B can turn on during odd frames. In another embodiment the point light sources 110A and 110B are different colors (e.g. one red LED and one green LED) providing continuous illumination falling upon a color video imager 120, producing a multi-color video image. When viewed with appropriate filter glasses (e.g. right eye covered by a red filter and left eye covered with a green filter), producing a color-coded three dimensional viewing experience known as color analyglyph.

Each point light sources 110A and 110B creates a pair of shadows for each object. The distance between the shadow pair for each object is called disparity shift. The further the object is away from the imager 120, the greater the disparity. The height of the object above the imager can be calculated by the following formula. Representative dimensions are provided from one embodiment of the invention;

$$Z = d * W * (D/G)$$

where

Z=height of object above imager, in millimeters (~1 millimeter)

d=disparity shift (distance between object shadows), in pixels

W=imager 120 pixel width (~2-10 um)

D=distance from point source (110A and 110B) to imager 120 (~100 mm)

G=distance (110C) between point light source (110A and 110B) (~8 mm)

Figure 3B:
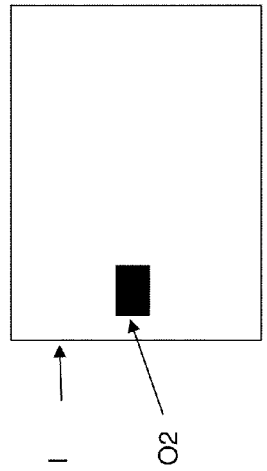
FIG. 3B illustrates the viewed image of the microscope shown in FIG. 3A.
Figure 4B:
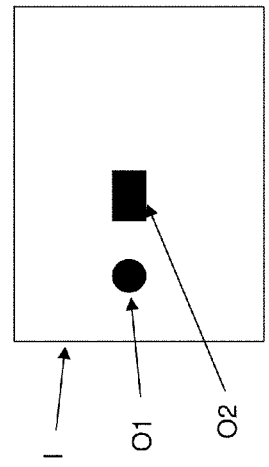
FIG. 4B illustrates the viewed image of the microscope shown in FIG. 4A.

As illustrated in FIGS. 3A-B and 4A-B, the optical microscopes can also include a movable viewing area feature. The viewing area is defined by the area of the imager 120 (imaging array sensing width times length). Translating the light source 110 will cause the viewed image I to move in the opposite direction, enabling objects that are out of the viewing area to come into the viewing area. For example, FIGS. 3A-B and 4A-B illustrate views, wherein on object O1 is positioned on the glass plate 126, and wherein an object O2 is not on the glass plate 126. Thus, when the point light source 110 is in a first position directly over the glass plate 126 (FIG. 3A), the object O1 is visible in the viewed image I but not the object O2 (FIG. 3B). However, when the point light source 110 is moved to a second position that is not over the glass plate 126 (FIG. 4A), both the object O1 and the object O2 are visible in the viewed image I (FIG. 4B).

The translation of the light source 110 may be caused manually by a microscope operator to track the movement of an object. In another embodiment a microscope operator wears a head mounted display (HMD), composed of two displays, one display for each eye. Head tracking technology is used to measure the rotation and tilt of the head. A two-axis servo motor is connected to the light source 110 and driven by control signals from the head tracking technology to cause the light source to move down when the operator tilts their head up, and move right when the operator rotates their head left, producing the immersive effect of the operator having microscopic vision.

Further, as illustrated in FIGS. 5A and 5B, the microscope's viewing area can be made arbitrarily wide by alternately placing point light sources 110 and imagers 120 on both sides along the length of a rectangular clear tube 130. Each pair of point light source 110 and imager 120 acts as a microscope. By alternating point light source 110 and imager 120, the area covered by each imager 120 can be adjacent (or a slight overlap to assure continuous coverage), and the resulting images tiled together to create an arbitrarily wide microscope. Each adjacent imager 120 faces alternating sides of an object, requiring a simple reversal (right/left) of the image since the silhouette of the object is the horizontally flipped when viewed from an opposite side. By placing the tube 130 vertically, a very tall microscope can be built, useful for studying the swimming pattern of plankton, for example. The tube 130 can be mounted on the arm of a centrifuge to study movement under simulated large gravitational field.

Although the imagers 120 are shown mounted with their horizontal axis along the length of the tube 130, they may be mounted with their vertical axis along the length of the tube 130 to maximize the resulting resolution (imagers typically have more pixels in the horizontal axis). For example six VGA imagers 120 would collectively form a 2880 (6×480) by 640 display.

Figure 6A:
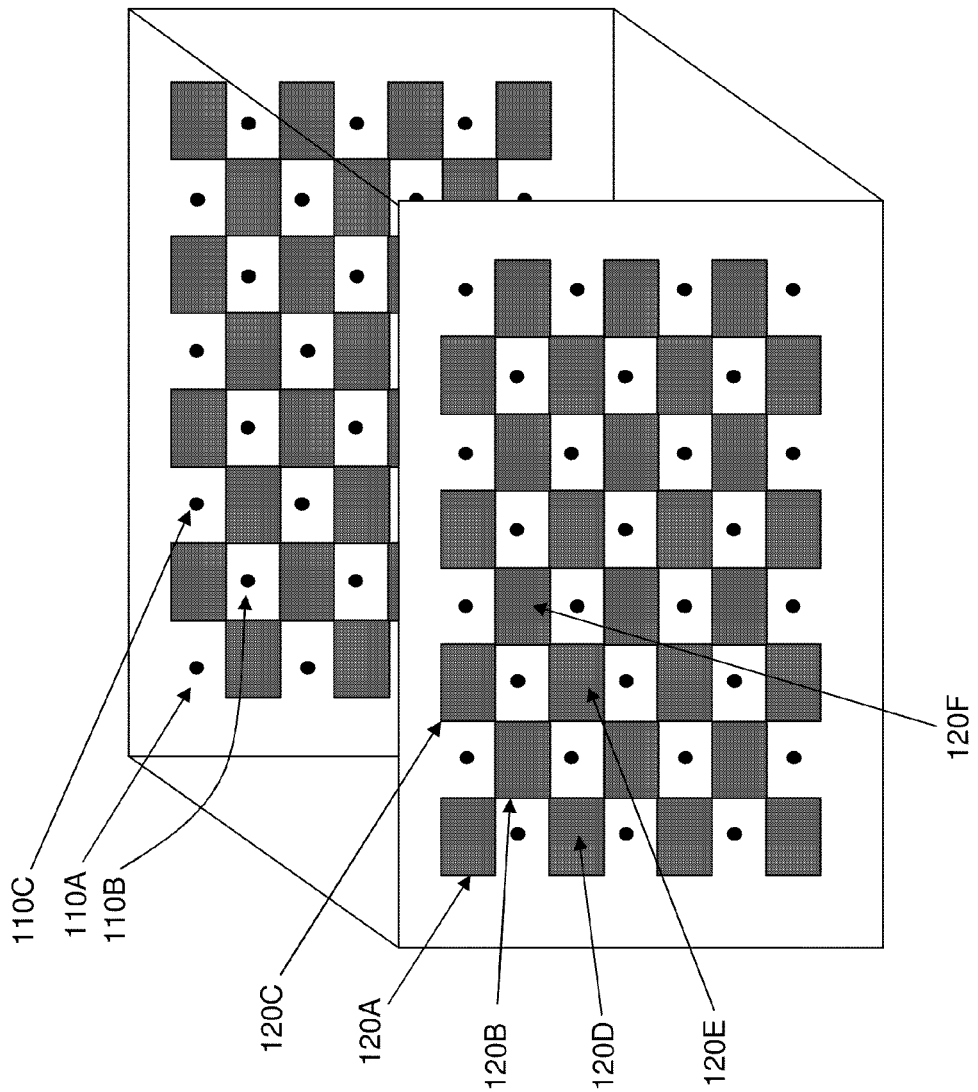
FIG. 6A illustrates a arbitrarily large field of view optical microscope.
Figure 6B:
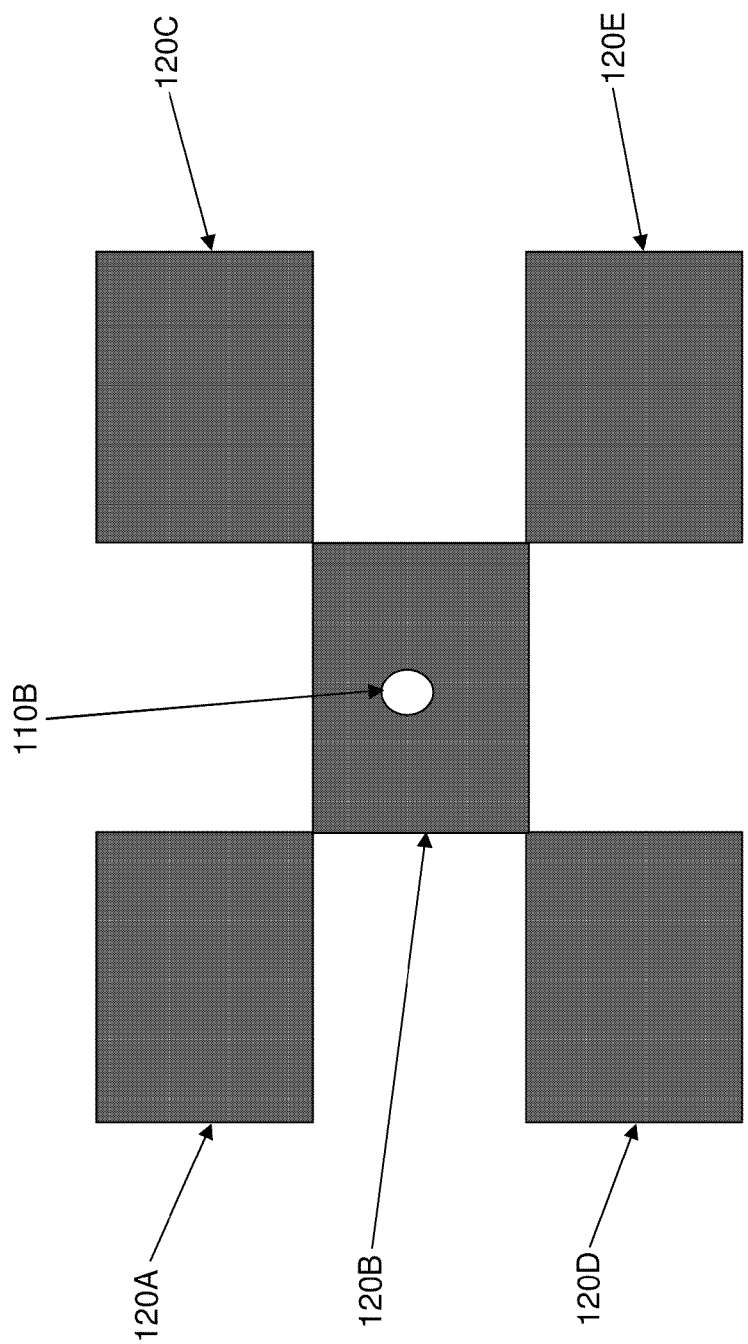
FIG. 6B illustrates five imagers of the arbitrarily large field of view optical microscope shown in FIG. 5A.

In addition, as illustrated in FIGS. 6A and 6B, the concept of the arbitrarily wide microscope may be applied in two dimensions to create a microscope of arbitrary large area field of view, both horizontally and vertically, by tiling pairs of imagers 120 and light sources 110 in a two dimensions checkerboard pattern. While the arbitrarily wide microscope affords a quiet zone between adjacent imagers 120, allowing the light from a neighboring point light source 110 to fall off (typically by the cosine of the angle formed between the image plane and point light source 110), the two dimensional version has imagers 120 that share a common corner, for example imager 120A (1,1) and imager 120B (2,1), wherein the first numeral in the parenthesis indicates the imager 120's vertical row coordinate, and wherein the second numeral in parenthesis indicates the imager 120's horizontal column coordinate. Imager 120B (2,1) is illuminated by point light source 110B (2,1); however, some light from point light source 110B (2,1) may reach adjacent imagers 120 on adjacent rows, specifically imagers 120A (1,1), 120C (1,2), 120D (3,1), and 120E (3,2), producing multiple shadows on imager 120B (2,1). To minimize illumination crosstalk, rows of point light sources 110 may be alternately illuminated, i.e., even rows and odd rows, corresponding to even and odd video fields, and the signals from corresponding column pairs of alternative row cameras combined, (e.g. imager 120A (1,1)+imager 120B (2,1), imager 120C (1,2)+imager 120F (2,2), etc.).

Another approach is to multiplex spectrally using a blue LED and blue filter on even row imagers 120 and green LED and red filters on odd row imagers 120, retaining full frame rate while blocking cross-talk illumination between adjacent rows. Since each imager 120 runs at full frame rate, the entire image is updated at full frame rate. Providing the full image from an array of imagers 120 enables parallel processing with one or more imagers 120 dedicated to a processor.

An example imager 120 is the OV6920 CMOS analog NTSC imager sensor (OmniVision 1341 Orleans Drive Sunnyvale, Calif. 94089). The OV6920 features QVGA resolution in a 1/18" optical format with a 2.5 um by 2.5 um pixel size at 60 fields per second frame rate. The large sensor-to-package fill ratio (sensing area divided by package area) of the OV6920 provides desired dense packing of the imager 120 into an array shown in FIG. 6A.

Figure 7:
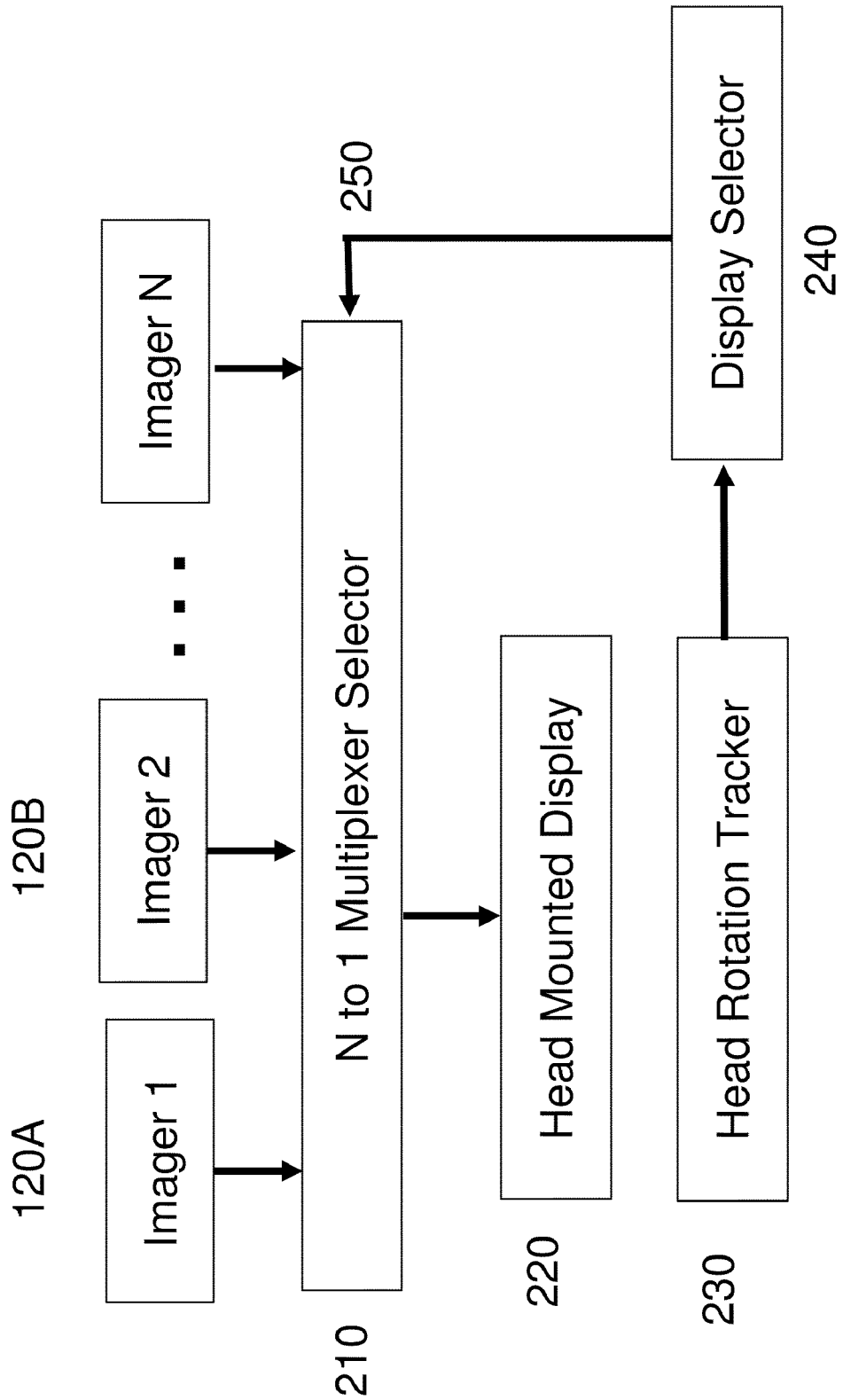
FIG. 7 illustrates an imager selector having head mounted display and head tracker.

The single point sources (110A, 110B, 110C) of the imaging array shown in FIG. 6A may be replaced with a pair of point light sources taught in FIG. 2, to create an arbitrarily large field of view stereo microscope. Referring to FIG. 7, the stereo output signal 200 from the imagers (120 A, 120 B, ... ) is applied to a multiplexing switch 210 and a selected imager output sent to a head mounted display 220. The rotation and tiling of the microscope operator's head is measured by a head tracker 230. The output of the head tracker 230 is received by a display selector 240 that outputs an address 250 selecting an imager appropriate to the rotation and tilt of the operator's head, giving the operator the experience of traversing a large microscopic viewing area. To avoid image discontinuities (jumps) when imagers are selected according to head movement, the imagers are so arranged to have a slight overlap, providing a smooth visual transition as imagers are selected.

Additionally, growth medium may be applied directly to a glass plate 126 and the imager 120 can be placed in an incubation oven (as long as the temperature does not exceed the operating range of the imager 120). The glass plate 126 provides the function of a micro-Petri dish, allowing bacteria to grow and detect small colonies, before a human eye could discern, yielding faster growth response tests, for example detecting the effectiveness of an antibiotic. For example, a layer of agar-agar can be poured and molded on the glass plate 126, an array of test antibiotics placed on top of the agar-agar, and the entire surface inoculated with bacteria, and the imager 120 placed in an incubator (temperature controlled oven). The growth of the culture is monitored and viewed remotely on a computer, allowing the computer to track the growth rate or a human operator to view the culture from any networked computer, while the culture grows in the incubator.

Biologists collect organism all over the world, often in remote locations and they need to bring a microscope in order to view plankton. A digital camera contains all of the essential ingredients of a portable microscope. The lens is removed and replaced with a specimen vessel (e.g., a rectangular tube glued to the glass plate 126 of the imager 120) and a fiber optic point light source 110 added. The camera's LCD viewscreen provides the biologist with a view of the organism and snapping a picture captures the image in the cameras memory. Modern digital cameras can store hundreds of megapixel images on flash memory or other media. All the software that supports conventional digital cameras can be used on microscope images. Modern cell phones now include megapixel digital cameras that can be adapted to be a microscope, enabling microscopic imaged captured in the field to be wirelessly emailed or streamed over the cellular network. The wireless microscope can be unattended and solar powered, providing remote sensing on land or sea for environmental monitoring A demonstration microscope is also provided, wherein a contact microscope is surrounded by syringes filled with various organisms (e.g., plankton) to allow a user to quickly view a succession of organism of interest. One larger syringe containing just salt water (or fresh water, depending on the species) can be utilized to flush the chamber before injecting new organisms. The lecturer (or student) can flush the viewing chamber which empties out into a waste container, and then inject a selected organism by pressing on one of the sample syringes, filling the viewing chamber with the selected organism.

Accordingly, the embodiments of the invention provide a microscope having a digital imaging device and at least one point light source located in a position relative to the digital imaging device to produce a specimen image on the digital imaging device. A mobile point light source can also be included, wherein the mobile point light source is movable relative to the digital imaging device. Moreover, a controller to control movement of the mobile point light source may be provided, such that movement of the mobile point light source corresponds to user movement of the controller.

The microscope can also include a head tracker to generate and output a head tracking signal indicating head movement. Thus, the controller can be connected to receive the head tracking signal and to move the mobile point light source in response to the head tracking signal.

Another microscope can include a digital imaging device and at least two point light sources proximate the digital imaging device, causing the digital imaging device to output a disparity signal. This microscope can also have a display device operatively connected to the digital imaging device, to receive the disparity signal and display a stereo image. The digital imaging device can produce a temporal sequence of frames, wherein the point light sources alternately illuminate synchronous to the frames, and wherein the disparity signal comprises a frame synchronous stereo image stream. Moreover, the point light sources are of different color, wherein the disparity signal comprises a color encoded stereo image. The microscope can also have an image processing device to receive the disparity signal and calculate the location of a specimen placed between the digital imaging device and the point light sources.

Yet another microscope can be provided having a first side and a second side opposite the first side. The first side can include first point light sources and first digital imaging devices; and, the second side can include second point light sources and second digital imaging devices. The first point light sources correspond to the second digital imaging devices; and, the second point light sources correspond to the first digital imaging devices.

The first side comprises an alternating pattern of the first digital imaging devices and the first point light sources. The first digital imaging devices and the first point light sources are positioned on the first side in a grid formation comprising alternating horizontal and vertical patterns of the first digital imaging devices and the first point light sources.

The second point light sources cause the digital imaging devices to output a disparity image. Furthermore, the microscope can include a switching multiplexer to receive output from the first and second digital imaging devices and to output a selected imaging output. A head mounted display can be provided to receive the selected imaging output. Wireless transmitters can also be included that are operatively connected to the first digital imaging devices and the second digital imaging devices.

Figure 8:
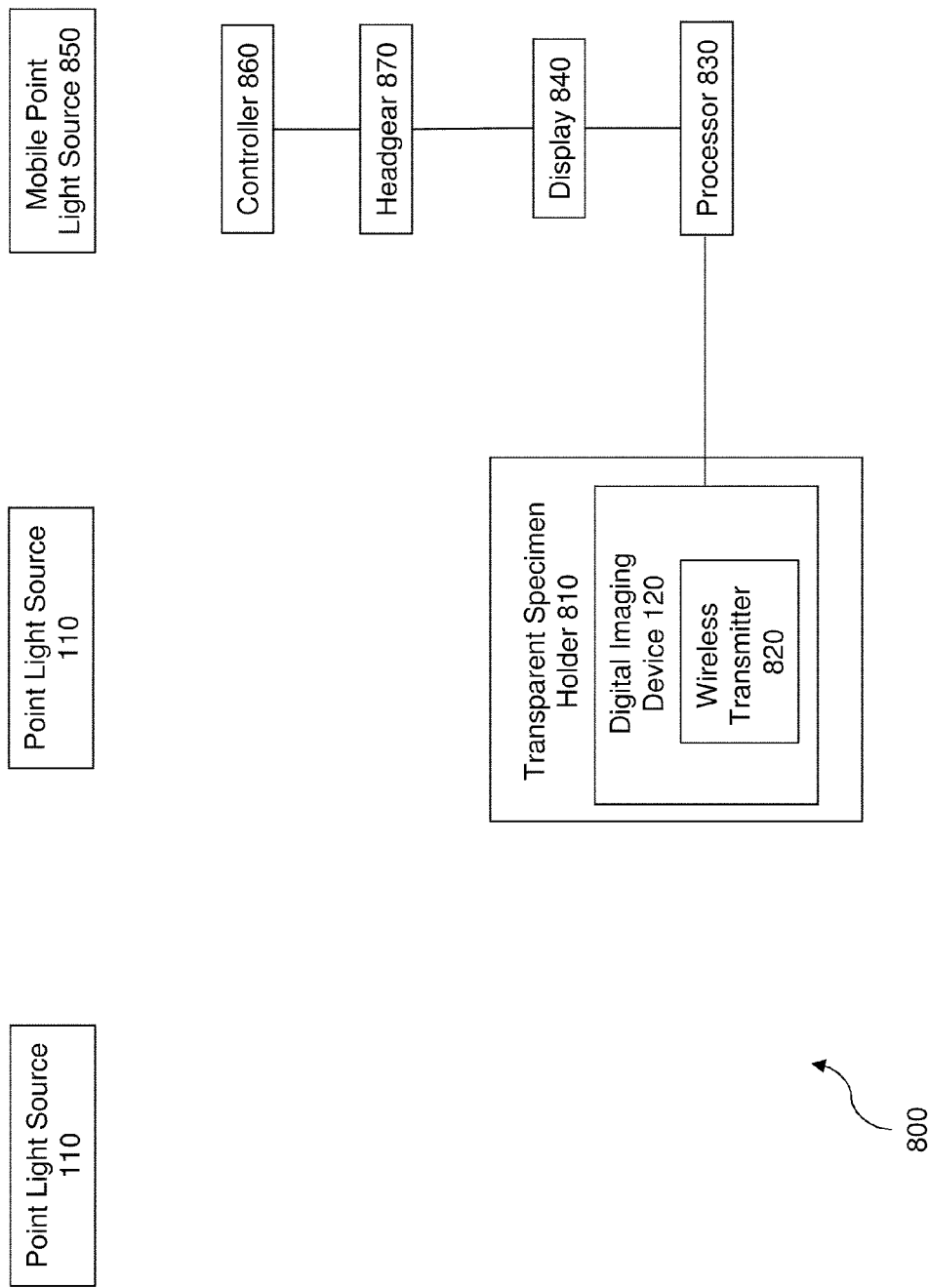
FIG. 8 illustrates a contact microscope using point source illumination.

As illustrated in FIG. 8, the embodiments of the invention further include a microscope 800 having a transparent specimen holder 810 and a digital imaging device 120 positioned within the transparent specimen holder 810. The digital imaging device 120 can include a wireless transmitter 820. More specifically, as illustrated in FIG. 9, the digital imaging device 120 is positioned within the transparent specimen holder 810. The transparent specimen holder 810 can have a top surface 812 and a bottom surface 814, wherein the transparent specimen holder 810 is completely transparent between the top surface 812 and the bottom surface 814. Thus, the transparent specimen holder 820 is completely transparent above and below the digital imaging device 120. Furthermore, a processor 830 is operatively connected to the digital imaging device 120, wherein the processor 830 produces an image of a specimen positioned on the specimen holder. A display 840 is operatively connected to the processor 830, wherein the display 840 displays the image.

The microscope can also include at least two point light sources 110 above (proximate) the digital imaging device 120. The point light sources 110 are positioned in a location adjacent the specimen holder so as to illuminate the specimen. Each of the point light sources 110 have a monochromatic LED operatively connected to a fiber optic cable (e.g., see FIG. 1). Additionally, a mobile point light source 850 can be provided, wherein the mobile point light source 850 is movable relative to the digital imaging device 120 (e.g., see FIGS. 3A-4B). A controller 860 can control movement of the mobile point light source 850, such that movement of the mobile point light source 850 corresponds to user movement of the controller 860. Moreover, a headgear 870 can be included, wherein the controller 860 and/or the display 840 are connected to the headgear 870.

As illustrated in FIG. 10, another microscope can include a hermetically sealed specimen chamber 1000, wherein a point light source 110 is positioned within the specimen chamber 1000. At least one additional point light source 110B can also be positioned within the specimen chamber 1000. A digital imaging device 120 is also positioned within the specimen chamber 1000, wherein a processor 830 is operatively connected to the digital imaging device 120. A display 840 operatively connected to the processor 830 is also provided, wherein the processor 830 produces an image and the display 840 displays the image.

Microscopes are important tools to visualize objects too small or translucent for the human eye to see. Optical microscopes use lenses to magnify the size of an object for ocular viewing. A camera may be attached to a microscope to capture images. The present invention teaches a new microscope that places the object between a point light source and an imaging array. The resulting microscope is less expensive, easier to use, smaller, more flexible and robust than a conventional optical microscope.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A contact microscope, comprising:
   at least one point light source positioned above a specimen supporting region; and
   an imager that contacts and underlies said specimen supporting region, said imager comprising:
      a glass plate that forms a top surface of said imager, wherein a portion of said top surface of said glass plate comprises said specimen supporting region;
      a Complementary Metal Oxide Semiconductor (CMOS) imager die located beneath said glass plate, wherein said CMOS imager die receives an optical image of said specimen that does not pass through an optical lens; and
      a circuit board, which lies beneath said CMOS imager die,
      said specimen supporting region intersects a unidirectional path of light from said at least one point light source to said CMOS imager die.

2. The contact microscope of claim 1, wherein said at least one point light source comprises an Light Emitting Diode (LED) coupled through a first end of a thin fiber optic and a second end of said thin fiber optic is positioned above said specimen supporting region.

3. The contact microscope of claim 2, wherein said LED is a blue LED.

4. The contact microscope of claim 1, wherein said at least one point source comprises a surface mount LED.

5. The contact microscope of claim 1, wherein said CMOS imager die comprises pixels of about 2 µm size.

6. A contact microscope, comprising:
   at least one point light source positioned above a specimen supporting region, wherein said at least one point light source comprises a Light Emitting Diode (LED) coupled through a first end of a thin fiber optic and a second end of said thin fiber optic is positioned above a specimen supporting region; and
   an imager that contacts and underlies a specimen supporting region, said imager comprising:
      a glass plate that forms a top surface of said imager, wherein a portion of said top surface of said glass plate comprises said specimen supporting region;
      a Complementary Metal Oxide Semiconductor (CMOS) imager die located beneath said glass plate, wherein said CMOS imager die receives an optical image of said specimen that does not pass through an optical lens; and
      a circuit board, which lies beneath said CMOS imager die,
      said specimen supporting region intersects a unidirectional path of light from said at least one point light source to said CMOS imager die.

7. A contact microscope, comprising:
   at least one point light source positioned above a specimen supporting region; and
   an imager that contacts and underlies said specimen supporting region, said imager comprising:
      a glass plate that forms a top surface of said imager, wherein a portion of said top surface of said glass plate comprises said specimen supporting region;
      a Complementary Metal Oxide Semiconductor (CMOS) imager die located beneath said glass plate, wherein said CMOS imager die receives an optical image of said specimen that does not pass through an optical lens, and wherein said CMOS imager die comprises pixels of about 2 µm size; and
      a circuit board, which lies beneath said CMOS imager die,
      said specimen supporting region intersects a unidirectional path of light from said at least one point light source to said CMOS imager die.

* * * * *